United States Patent Office 3,240,777
Patented Mar. 15, 1966

3,240,777
STEROID 16α-GLUCURONIDE OF THE ANTI-INFLAMMATORY PREGNANE SERIES
Lewis H. Sarett, Princeton, Robert G. Strachan, Summit, and Ralph F. Hirschmann, Scotch Plains, N.J., assignors to Merck & Co. Inc., Rahway, N.J., a corporation of New Jersey
No Drawing. Filed Feb. 18, 1963, Ser. No. 259,373
8 Claims. (Cl. 260—239.55)

This invention is concerned generally with novel steroid glucuronides and galacturonides. More particularly, it relates to 16α-monoglucuronides and galacturonides of ring A unsaturated 11,17-bis-oxygenated-20-keto-steroids of the anti-inflammatory pregnane series; with processes by which these compounds may be prepared and with pharmaceutical compositions containing them. These novel steroid derivatives, while possessing the anti-inflammatory activity characteristic of cortisone differ from cortisone, hydrocortisone, and their Δ¹-derivatives, prednisone and prednisolone in being remarkably free from ulcerogenic action, adrenal atrophy, thymus involution and body weight loss side effects which have resulted from prolonged administration of the aforementioned anti-inflammatory steroids.

This application is continuation-in-part of our copending patent application Serial Number 142,792, filed October 4, 1961, now U.S. Patent No. 3,161,577.

Novel compounds within the scope of this invention may be chemically represented as follows:

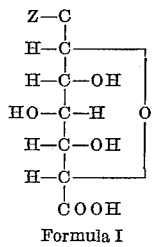

Formula I

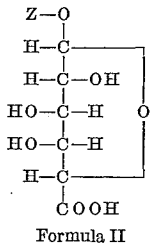

Formula II wherein Z stands for the radical of a ring A unsaturated 16-hydroxy-11,17-bis-oxygenated-20-keto steroid of the pregnane series in which the hydrogen atom has been replaced with a glucuronide (Formula I) or galacturonide (Formula II) moiety respectively.

The galacturonides and glucuronides of this invention are similarly prepared. For simplicity, the invention will be described with reference to the glucuronide derivatives but it should be kept in mind that what is said with reference to the glucuronides is equally applicable to the preparation of the 4′-epimers thereof, i.e., the galacturonides.

The 16α-glucuronides of ring A unsaturated 11,17-bis-oxygenated-20-keto-steroids of the pregnane series may be prepared by reacting the corresponding steroid 16α-free alcohol-21-acylate compound with an alkyl (tri-O-acyl-α-D-glucopyranosyl bromide)-uronate, preferably methyl (tri-O-acetyl-α-D-glucopyranosyl bromide)-uronate, to form the corresponding alkyl (steroid-16α-yl tri-O-acyl-β-D-glucopyranosid)-uronate, more particularly the methyl (steroid-16α-yl tri-O-acetyl-β-D-glucopyranosid)-uronate, which is then reacted with an alkaline hydrolyzing agent, thereby forming the corresponding salt of the steroid 16-glucuronide, having a free hydroxyl group at the 21-position.

These reactions may be chemically represented as follows:

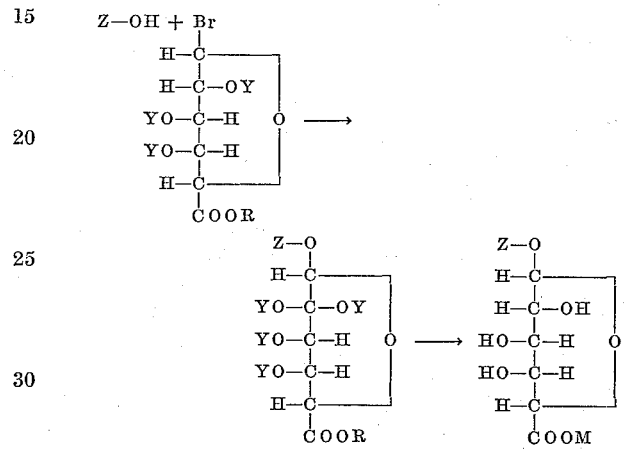

In the foregoing formulas, Y stands for acyl, R represents alkyl, M stands for cation, Z—OH stands for a 16α-hydroxy-ring A unsaturated 11,17-bis-oxygenated-20-ketosteroid of the anti-inflammatory pregnane series, and Z— has the significance above-defined. The salt of the steroid glucuronide may be converted to the steroid glucuronide free acid by reaction with a cation exchange resin on the hydrogen cycle, although the resulting product is unstable under acidic conditions.

Our ring A unsaturated-11,17-bis-oxygenated 20-keto-steroid 16α-glucuronides of the pregnane series are conveniently prepared by reacting the steroid 16α-free alcohol-21-acylate such as the acetate, propionate, benzoate, or butyrate and the alkyl (tri-O-acyl-α-D-glucopyranosyl bromide)-uronate together in a hydrogen solvent, such as benzene, in the presence of a base such as silver carbonate, and heating the resulting mixture at an elevated temperature. During the course of the reaction, the color of the reaction mixture ordinarily changes from yellow to maroon and, where silver carbonate is used as the base, the silver bromide produced during the reaction forms as a suspension in the reaction mixture. The solution containing the steroid-uronate reaction product is then separated from the silver bromide (or other bromide salt by-products) and the filtered solution is then evaporated to dryness to give the corresponding alkyl (ring A unsaturated 11,17-bis-oxygenated-20-keto-pregnane-16α-yl tri-O-acyl-β-D-glucopyranosid)-uronate, which is conveniently purified by chromatography on activated alumina using mixtures of benzene and chloroform as the eluting solvents.

The hydrolysis reaction, which is preferably carried out in a nitrogen atmosphere, is conveniently conducted by bringing together in solution in a lower alcohol solvent such as methanol, the alkyl (ring A unsaturated 11,17-bis-oxygenated-20-keto-pregnane-16α-yl tri - O - β-D-glucopyranosid)-uronate and a metal alkoxide such as sodium methoxide, stirring the resulting mixture together at room temperature for a period of about one-half to one hour, and then adding to the reaction solution an aqueous alkaline solution, preferably an aqueous solution of barium hydroxide, and stirring the resulting aqueous mixture at room temperature for an additional one-half to one hour period. When barium hydroxide is used, the barium salt of the ring A unsaturated 11,17-bis-oxygenated-16α-hydroxy-20 - keto - pregnane 16-glucuronide precipitates from the aqueous mixture and is conveniently recovered by filtration. This barium salt is converted to another pharmacologically acceptable salt, as for example an alkali metal salt such as the sodium salt, an ammonium salt, the choline salt, a basic amino acid salt such as the arginine salt, and the like, by dissolving the barium salt in a minimal amount of water and contacting the aqueous solution with a carboxylic-type cation exchange resin on the appropriate metal cycle, for example the sodium cycle. The resulting aqueous solution of the desired alkali metal salt (e.g. the sodium salt) of the ring A unsaturated 11,17-bis-oxygenated-16α-hydroxy - 20 - ketone-pregnane 16-glucuronide is then evaporated at low temperature, preferably by freeze-drying, to give the alkali metal salt of the ring A unsaturated 11,17-bis-oxygenated-16α-hydroxy-20-keto-pregnane 16-glucuronide in substantially pure form.

In accordance with these procedures, there are obtained pharmacologically acceptable derivates, in particular salts with alkali and alkaline earth metals, choline, basic amino acids, and the like, of ring A unsaturated 11,17-bis-oxygenated 16α-hydroxy - 20-keto - pregnane glucuronides as, for example, the 16-glucuronides of the following ring A unsaturated 11,17-bis-oxygenated-21-hydroxy-20-keto-steroids of the anti-inflammatory pregnane series: 16α-hydroxy-cortisone, 16α-hydroxy-hydrocortisone, and $\Delta^1$-isomers and/or $\Delta^6$ isomers thereof, derivatives of any of these compounds having fluoro, chloro, or bromo substituents attached to the 6, and/or 9 carbon atoms, and/or methyl substituents attached to the 2, and/or 6 carbon atoms; and the like. Of particular interest are the sodium salts of the 16-glucuronides of 9α-fluoro-16α-hydroxy-hydrocortisone, prednisolone, their 2- and 6-methyl derivatives, their $\Delta^6$-derivatives and their [3,2-c]-pyrazolo derivatives.

The following examples illustrate methods of carrying out the present invention, but it is to be understood that these examples are given for purposes of illustration and not of limitation.

*Example I*

To a substantially anhydrous mixture of about 0.015 mole of the 16α-hydroxy ring A unsaturated 11,17-bis-oxygenated-20-keto-pregnane 21-acetate, approximately 0.03 moles (about 7.40 g.) of silver carbonate and about 350 ml. of benzene, in a distillation apparatus provided with an agitator and protected from moisture, is added a substantially anhydrous solution of approximately 0.02 mole (about 8.00 g.) of methyl (tri-O-acetyl-α-D-glucopyranosyl bromide)-uronate in 50 ml. of benzene over a period of one hour while distilling benzene from the reaction mixture at a substantially equal rate. During the course of the reaction, the color of the mixture changes from yellow to maroon. The distillation of the benzene is continued for an additional forty minute period, the reaction mixture is cooled to room temperature, and the silver bromide formed during the reaction is separated from the mixture by filtration. The filtered solution is evaporated to dryness in vacuo to give the corresponding methyl (21-acetoxy ring A unsaturated 11,17-bis-oxygenated-20-keto-pregnane-16α-yl tri-O-acetyl-β-D-glucopyranosid)-uronate in a yield approaching that theoretically obtainable.

This material is conveniently purified by dissolving it in benzene-chloroform (9:1), passing the resulting solution through a column containing approximately 350 g. of neutral activated alumina, and eluting the resulting adsorbate, with mixtures of benzene and chloroform containing successively increasing amounts of the latter.

In accordance with the above procedure, but using 0.02 mole of ethyl (tri-O-acetyl-α-D-glucopyranosyl bromide)-uronate instead of methyl (tri-O-acetyl-α-D-glucopyranosyl bromide)-uronate, there is obtained the corresponding ethyl (21-acetoxy-ring A unsaturated 11,17-bis-oxygenated-20-keto-pregnane-16α-yl tri-O-acetyl-β-D - glucopyranosid)-uronate.

Similarly, using 0.02 moles of another alkyl (tri-O-alkanoyl-α-D-glucopyranosyl bromide)-uronate, as for example butyl (tri-O-propionyl - α - D-glucopyranosyl bromide)-uronate in the foregoing reaction, there is obtained the corresponding alkyl (21-acetoxy ring A unsaturated 11,17 - bis-oxygenated-20-keto-pregnane-16α-yl tri-O-alkanoyl-β-D-glucopyranosid)-uronate, as for example butyl (ring A unsaturated 11,17-bis-oxygenated-20-keto-pregnane-16α-yl tri - O-propionyl-β-D-glucopyranosid)-uronate.

The foregoing procedure is utilized to prepare methyl, ethyl and other lower alkyl (21-acetoxy ring A unsaturated 11,17 - bis-oxygenated-20-keto-pregnane-16α-yl-tri-O-acetyl-β-D-glucopyranosid)-uronates and the epimeric galactpyranosides of the following compounds. The list is given to avoid unnecessary repetition of experimental details.

9α-fluoro-11β,16α,17α,21-tetrahydroxy-4-pregnene-3,20-dione

9β-fluoro-2-methyl-11β,16α,17α,21-tetrahydroxy-1,4-pregnadione-3,20-dione

6α,9α-difluoro-2α-methyl-11β,16α,17α,21-tetrahydroxy-4-pregnene-3,20-dione

6α,9α-difluoro-2-methyl-11β,16α,17α,21-tetrahydroxy-1,4-pregnadiene-3,20-dione

*Example II*

Approximately 0.005 mole of alkyl (21-acetoxy ring A unsaturated 11,17-bis-oxygenated - 20 - keto-pregnane 16α-yl tri-O-acyl-β-D-glucopyranosid)-uronate is dissolved in about 70 ml. of methanol, and to this solution is added about 20 ml. of an approximately 1 N solution of sodium methoxide in methanol. The resulting mixture is stirred under nitrogen at room temperature for approximately 30 minutes. To the resulting mixture is then added, dropwise with stirring, about 250 ml. of an approximately 0.1 N aqueous solution of barium hydroxide, whereupon a precipitate separates. The resulting slurry is stirred at room temperature for an additional period of about 30 minutes, and the precipitated material is recovered by filtration, washed with methanol until neutral, and dried to give approximately 0.001 mole of the barium salt of the ring A unsaturated 11,17-bis-oxygenated-21-hydroxy - 20 - keto-pregnane-16α-glucuronide. Additional material is recovered by cooling the mother liquor and allowing it to stand at 0° C.

Approximately 0.001 mole of the barium salt of the ring A unsaturated 11,17-bis-oxygenated-21-hydroxy-20-keto-pregnane 16α-glucuronide is dissolved in a minimum quantity of water at room temperature, and the resulting solution is filtered. To this filtered solution is added about 30 g. of a carboxylic type cation exchange resin (e.g. Amberlite IRC–50 resin manufactured by Rohm & Haas Company, Philadelphia, Pennsylvania), on the sodium cycle, and the mixture is stirred at room temperature for about thirty minutes. The reaction solution is separated from the resin (as by filtration or decantation), extracted with a halogenated hydrocarbon solvent such as methylene chloride (thereby extracting ring A unsaturated 11,17 - bis-oxygenated-21-hydroxy-20-ketopregnane which may be present), and evaporated to dryness at low temperature (e.g. by freeze-drying) to give approximately 0.001 mole of the sodium salt of the ring A unsaturated 11,17-bis-oxygenated-21 hydroxy-20-keto-pregnane-16α-glucuronide.

In accordance with the above procedure, but using the carboxylic cation exchange resin on another metal cation cycle, for example an alkali metal cation such as potassium (K+), an alkaline earth metal cation such as calcium (Ca++), and the like (instead of the sodium cycle), there is obtained the corresponding metal salt of the ring A unsaturated-11,17-bis-oxygenated-21-hydroxy-20-keto-pregnane 16α-glucuronide, such as the potassium salt of the ring A unsaturated-11,17-bis-oxygenated - 21-hydroxy-20-keto-pregnane 16-glucuronide, the calcium salt of the ring A unsaturated-11,17-bis-oxygenated-21-hydroxy-20-keto-pregnane 16-glucuronide, and the like.

In accordance with the above procedure, using methyl (21-acetoxy ring A unsaturated-11,17-bis-oxygenated-20-keto-pregnane-16α-yl tri-O-acetyl-β-D-glucopyranosid)-uronate as starting material and the carboxylic cation exchange resin on the sodium cycle, there is obtained the sodium salt of the corresponding ring A unsaturated-11,17-bis-oxygenated-21-hydroxy-20-keto-pregnane 16-glucuronide.

The foregoing procedure is utilized to prepare sodium and other alkali and alkaline earth metal salts of the 16-hydroxy ring A unsaturated-11,17-bis-oxygenated-20-keto-pregnane 16-glucuronides and galacturonides of each of the compounds prepared in accordance with the procedure of Example I, for example.

Sodium salt of 9α-fluoro-11β,17α,21-trihydroxy-3,20-dione-4-pregnene-16α-yl 16-glucuronide Sodium salt of 9α-fluoro-2-methyl-11β,17α,21-trihydroxy-3,20-dione-1,4-pregnadiene-16α-yl 16-glucuronide Sodium salt of 6α,9α-difluoro-2α-methyl-11β,17α,21-trihydroxy-3,20-dione-16α-yl 16-glucuronide Sodium salt of 6α,9α-difluoro-2-methyl-11β,17α,21-trihydroxy-3,20-dione-1,4-pregnadiene-16α-yl 16-glucuronide The alkyl (tri-O-acyl-β-D-glucopyranosyl bromide)-uronates such as methyl (tri-O-acetyl-β-D-glucopyranosyl bromide)-uronate, used as starting materials in the foregoing examples are prepared as follows: a mixture of about 18 g. of glucuronolactone, 0.15 g. of sodium methoxide and 100 ml. of methanol is stirred at room temperature for a period of approximately one hour. The resulting reaction solution is evaporated to a syrup in vacuo. This syrup is then dissolved in approximately 70 ml. of acetic anhydride, and to this solution is added, dropwise with stirring, a solution of 0.3 ml. of perchloric acid in 10 ml. of acetic anhydride, while maintaining the reaction temperature below about 40° C. The resulting mixture is allowed to stand at room temperature for a period of about 15 hours, an additional 0.1 ml. of perchloric acid is added, and the resulting solution cooled to about 0° C. and maintained at that temperature for an additional 15 hour period. The crystalline material which separates is recovered by filtration, washed with ether, and recrystallized from ethanol to give substantially pure methyl tetra-O-acetyl-β-D-glucopyranuronate.

Utilizing the foregoing procedure by using, (1) in place of the 100 ml. of methanol there employed, approximately 100 ml. of another alcohol such as ethanol, propanol, butanol, benzyl, alcohol, and the like, (2) in place of the 0.15 g. of sodium methoxide, about 0.15–0.2 g. of a sodium alkoxide corresponding to the alcohol utilized, i.e. sodium ethoxide, sodium propoxide, sodium butoxide, sodium benzoxide, respectively, and (3) in place of the 70 ml. of acetic anhydride, about 70–100 ml. of another acyl anhydride such as propionic anhydride, butyric anhydride, and the like, there is obtained the corresponding alkyl tetra-O-acyl-β-D-glucopyranuronate such as ethyl tetra-O-propionyl-β-D-glucopyranuronate; butyl tetra-O-butyryl-β-D-glucopyranuronate; benzyl tetra-O-acetyl-β-D-glucopyranuronate, and the like.

A solution of about 50 g. of methyl tetra-O-acetyl-β-D-glucopyranuronate in about 200 ml. of 30% hydrobromic acid in acetic acid is cooled to about 0° C. and allowed to stand at that temperature for a period of about 15 hours. The solvent is evaporated from the reaction solution in vacuo at a temperature of below about 40° C. and the residual material is dissolved in 100 ml. of chloroform. The chloroform solution is washed with cold saturated sodium bicarbonate solution, then with water, and dried over anhydrous sodium sulfate. The washed dried chloroform solution is evaporated in vacuo to a syrup. The residual syrup is dissolved in about 150 ml. of absolute ethanol, treated with activated charcoal, filtered, and the filtered solution cooled to about 0° C. and allowed to stand at that temperature for about 15 hours. The crystalline material which separates is recovered by filtration and dried to give substantially pure methyl (tri-O-acetyl-α-D-glucopyranosyl bromide)-uronate.

Similarly, utilizing other alkyl tetra-O-acyl-β-D-glucopyranuronates such as ethyl tetra-O-propionyl-β-D-glucopyranuronate; butyl tetra-O-butyryl-β-D-glucopyranuronate; benzyl tetra-O-acetyl-β-D-glucopyranuronate, and the like in the foregoing reaction with the 30% hydrobromic acid in acetic acid, there is obtained the corresponding alkyl (tri-O-acyl-α-D-glucopyranosyl bromide)-uronate such as ethyl (tri-O-propionyl-α-D-glucopyranosyl bromide)-uronate; butyl (tri-O-butyryl-α-D-glucopyranosyl bromide)-uronate; benzyl (tri-O-acetyl-α-D-glucopyranosyl bromide)-uronate, and the like.

The 16-hydroxy-21-monoacylates which are used as starting materials herein are prepared as follows: a mixture of 16,21-diacetate and 21-monoacetate prepared by treating a steroid substrate for example 9α-fluoro-11β,16α,17α,21-tetrahydroxy-1,4-pregnadiene-3,20-dione with 1.1 to 1.2 molar equivalents of acetic anhydride in pyridine is extracted with an excess of 0.1 M aqueous sodium tetraborate. The diacetate is insoluble. The 21-monoacetate dissolves in the alkaline solution and precipitates on standing at room temperature after adjusting the pH to 1.2–2.0 with concentrated hydrochloric acid.

These new ring A unsaturated 11,17-bis-oxygenated 20-keto-steroid glucuronides of the anti-inflammatory pregnane series possess anti-inflammatory activity characteristic of cortisone, and their use results in little salt and water retention or adrenal atrophy. They are, in addition, remarkably free from thymus involution and body-weight-loss side effects ordinarily accompanying the prolonged administration of anti-inflammatory steroids. They are normally administered in a daily maintenance dosage range comparable with that utilized in the administration of the corresponding 16α-hydroxy ring A unsaturated 11,17-bis-oxygenated 20-keto steroids such as triamcinolone. In view of their selective anti-inflammatory action (substantially unaccompanied by undesired side effects), they may, in the case of aggravated inflammatory conditions, be administered in substantially higher dosages without attendant risk of side effects; and, in milder conditions, may often be administered in substantially lower dosages in view of their pronounced anti-inflammatory action directly at the site of the inflammation. While due to their relative instability in acid solution, these ring A unsaturated 11,17-bis-oxygenated 20 - keto - steroid glucuronides are ordinarily administered by injection, they may also be administered by the oral route, preferably admixed with and/or coated by, an alkaline-reacting pharmacologically-acceptable buffer substance, or in an enteric-coated capsule.

What is claimed is:

1. Sodium salt of 9α-fluoro-11β,17α,21-trihydroxy-3, 20-dione-1,4-pregnadiene-16α-yl 16-glucuronide.

2. Sodium salt of 9α-fluoro-11β,17α,21-trihydroxy-3,20-dione-4-pregnane-16α-yl 16-glucuronide.

3. Sodium salt of 9α-fluoro-11β,17α,21-trihydroxy-3,20-dione-1,4-pregnadiene-16α-yl 16-galacturonide.

4. Sodium salt of 9α-fluoro-11β,17α,21-trihydroxy-3,20-dione-4-pregnene-16α-yl 16-galacturonide.

5. Methyl (9α-fluoro-21-acetoxy-11β,17α-dihydroxy-3,20-dione-1,4-pregnadiene - 16α-yl-tri-O-acetyl-β-D-glucopyranosid)-uronate.

6. Methyl (9α-fluoro-21-acetoxy-11β,17α-dihydroxy-3,20-dione-4-pregnene-16α-yl - tri-O-acetyl-β-D-glucopyranosid)-uronate.

7. Methyl (9α-fluoro-21-acetoxy-11β,17α-dihydroxy-3,20 - dione - 1,4 - pregnadiene - 16α - yl - tri-O-acetyl-β-D-galacto-pyranosid)-uronate.

8. Methyl (9α-fluoro-21-acetoxy-11β,17α-dihydroxy-3,20-dione-1,4-pregnadiene - 16α-yl-tri-O-acetyl-β-D-galactoranosid)-uronate.

No references cited.

LEWIS GOTTS, *Primary Examiner.*